United States Patent
Ge et al.

(10) Patent No.: US 9,376,116 B1
(45) Date of Patent: Jun. 28, 2016

(54) CONTROL SYSTEM FOR REDUCING POWERTRAIN INDUCED VIBRATIONS

(71) Applicant: Caterpillar Inc., Peoria, IL (US)

(72) Inventors: Xinyu Ge, Peoria, IL (US); Kai Zhang, Peoria, IL (US); Jingdou Wang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/642,291

(22) Filed: Mar. 9, 2015

(51) Int. Cl.
*G06F 7/00* (2006.01)
*B60W 30/20* (2006.01)
*G01H 11/00* (2006.01)

(52) U.S. Cl.
CPC ............... *B60W 30/20* (2013.01); *G01H 11/00* (2013.01); *B60W 2030/206* (2013.01)

(58) Field of Classification Search
None
See application file for complete search history.

(56) References Cited

U.S. PATENT DOCUMENTS

| | | | |
|---|---|---|---|
| 5,146,505 | A | 9/1992 | Pfaff et al. |
| 5,332,061 | A | 7/1994 | Majeed et al. |
| 7,206,681 | B2 | 4/2007 | Casey et al. |
| 7,747,353 | B2 | 6/2010 | Mizushima et al. |
| 8,600,627 | B2 | 12/2013 | Beck et al. |
| 2009/0204234 | A1* | 8/2009 | Sustaeta ............... G05B 13/024 700/29 |
| 2011/0096397 | A1* | 4/2011 | Ohashi ................. B06B 1/0269 359/507 |

* cited by examiner

*Primary Examiner* — Adam Alharbi
(74) *Attorney, Agent, or Firm* — Finnegan, Henderson, Farabow, Garrett & Dunner, LLP

(57) ABSTRACT

A vibration control system is disclosed for a machine having a powertrain secured by a mounting system. The control system may include a first sensor, a second sensor, a vibration inducing device, and a controller. The first sensor may be configured to generate a first signal indicative of a parameter of a work cycle of the machine, and the second sensor may be configured to generate a second signal indicative of vibrations induced by the powertrain. The controller may be in communication with the first sensor, the second sensor, and the vibration inducing device. The controller may be configured to classify a current operation of the machine as one of a plurality of predetermined segments of a work cycle based on the first signal, to predict a vibration profile that will be generated by the machine during a future segment of the work cycle, to tune a listening window based on the vibration profile, and to generate a command wave directed to the vibration inducing device to generate canceling vibrations during the future segments based on the second signal received within the listening window.

20 Claims, 3 Drawing Sheets

CONTROL SYSTEM FOR REDUCING POWERTRAIN INDUCED VIBRATIONS

TECHNICAL FIELD

The present disclosure relates generally to a control system, and more particularly, to a control system for reducing powertrain induced vibrations.

BACKGROUND

Machine operators experience significant levels of vibration, which may cause discomfort. Many regulatory bodies have imposed restrictions on the vibration levels that an operator can be exposed to over time. To comply with these restrictions, an operator's time on a particular machine can be limited. Specifically, the operator may be required to cease operation of the machine after experiencing a certain vibration level for a predetermined time. Alternatively, an active vibration management system may be employed in an attempt to reduce the average vibration level experienced by the operator and, thereby, prolong the allowed time on the machine.

Various feedback control systems have been proposed for actively reducing vibrations in a machine. Many of these systems involve sensing vibrations produced in the machine and generating canceling vibrations having a frequency component with essentially the same amplitude, but shifted by 180 degrees in phase. In order to be effective without magnifying the problem, these control systems must overcome a time lag between sensing the machine vibrations and generating the canceling vibrations.

U.S. Pat. No. 7,206,681 ("the '681 patent"), issued to Casey et al. on Apr. 17, 2007, describes an adaptive vibration management system that is configured to predict vibration levels produced by the machine. The predicted vibration levels are extrapolated based on current vibration levels and input commands indicative of anticipated operations of the machine. The system then adjusts an actual response of the machine (e.g., reducing a rate of acceleration) based on the predicted vibration levels to reduce the resulting vibration effects on the operator.

While the '681 patent may help reduce the vibrations transferred to the operator, the system may have several shortcomings. For example, the system of the '681 patent cannot differentiate between predictable engine vibrations and unpredictable external vibrations (e.g., vibrations caused by the impact of implements striking the ground). The external vibrations may not be repeated and can be several orders of magnitude greater than the amplitude of the engine vibrations. Therefore, sensing the totality of vibrations and responding to the external vibrations may lead to improper corrective measures that actually worsen the vibrations experienced by the operator.

The disclosed control system is directed to overcoming one or more of the problems set forth above and/or other problems in the prior art.

SUMMARY

One aspect of the present disclosure is directed to a vibration control system for a machine having a powertrain secured by a mounting system. The control system may include a first sensor, a second sensor, a vibration inducing device, and a controller. The first sensor may be configured to generate a first signal indicative of a parameter of a work cycle of the machine, and the second sensor may be configured to generate a second signal indicative of vibrations induced by the powertrain. The controller may be in communication with the first sensor, the second sensor, and the vibration inducing device. The controller may be configured to classify a current operation of the machine as one of a plurality of predetermined segments of the work cycle based on the first signal, to predict a vibration profile that will be generated by the machine during a future segment of the work cycle, to tune a listening window based on the vibration profile, and to generate a command wave directed to the vibration inducing device to generate canceling vibrations during the future segment based on the second signal received within the listening window.

Another aspect of the present disclosure is directed to a method of controlling vibrations of a machine having a powertrain. The method may include sensing a parameter indicative of a work cycle of the machine, responsively generating a first signal, and classifying a current operation of the machine as one of a plurality of predetermined segments of the work cycle based on the first signal. The method may also include predicting a vibration profile that will be generated by the machine during a future segment of the work cycle, and tuning a listening window based on the vibration profile. The method may further include sensing vibrations induced by the powertrain and received within the listening window, and generating a command wave based the sensed vibrations to generate canceling vibrations during the future segment.

Yet another aspect of the present disclosure is directed to a machine. The machine may include a frame and an implement system connected to the frame and configured to perform a work cycle. The machine may also include a powertrain supported by the frame, including an engine and a transmission, and a vibration control system. The vibration control system may include a first sensor, a second sensor, a vibration inducing device, and a controller. The first sensor may be configured to generate a first signal indicative of a parameter of the work cycle, and the second sensor may be configured to generate a second signal indicative of vibrations induced by the powertrain. The controller may be in communication with the first sensor, the second sensor, and the vibration inducing device. The controller may be configured to classify a current operation of the machine as one of a plurality of predetermined segments of the work cycle based on the first signal, to predict a vibration profile that will be generated by the machine during a future segment of the work cycle, to tune a listening window based on the vibration profile, and to generate a command wave directed to the vibration inducing device to generate canceling vibrations during the future segment based on the second signal received within the listening window.

DETAILED DESCRIPTION

Figure 1:
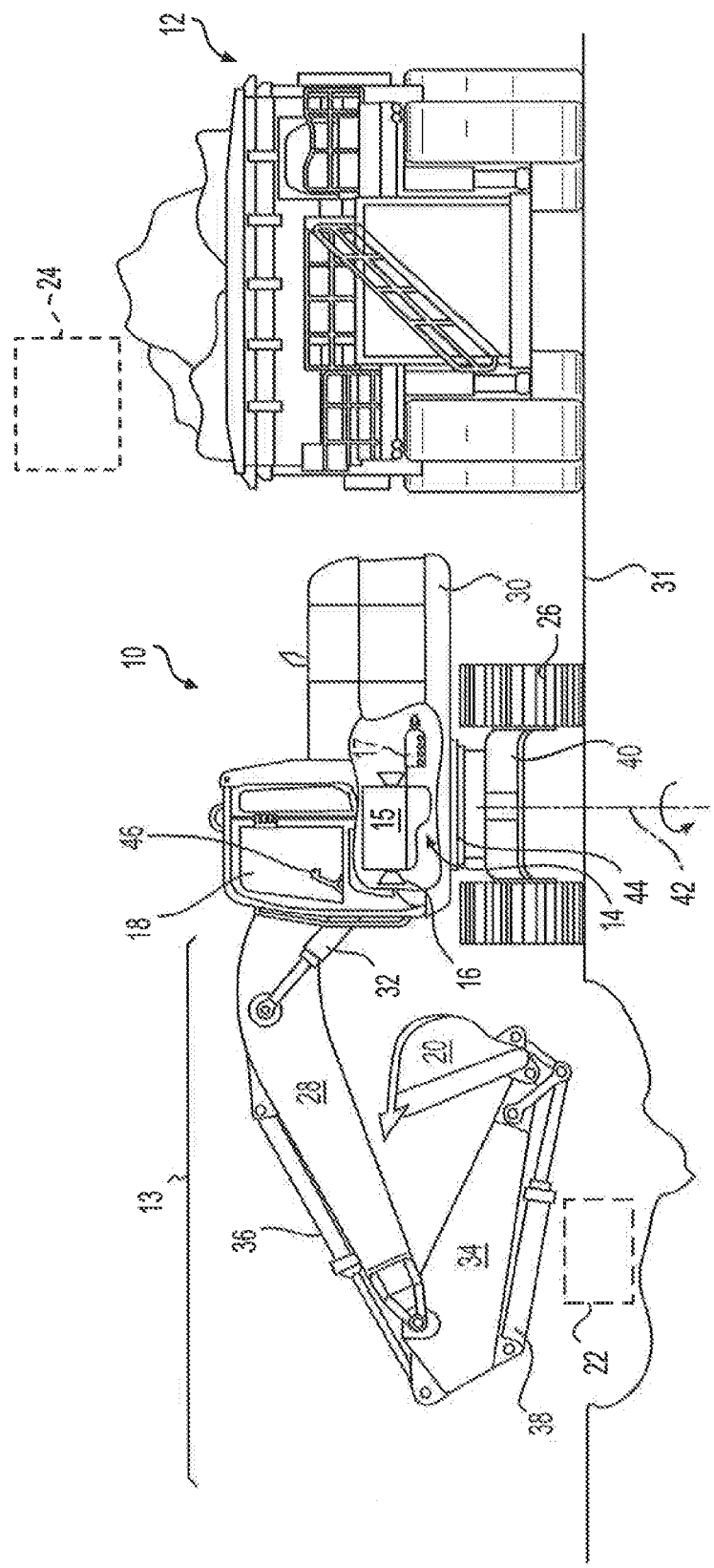
FIG. 1 is a diagrammatic illustration of an exemplary machine according to an aspect of the disclosure.

FIG. 1 illustrates an exemplary machine 10 having multiple systems and components that cooperate to excavate and load earthen material onto a nearby haul vehicle 12. In the disclosed example, machine 10 is a hydraulic excavator. It is contemplated, however, that machine 10 may embody another type of machine such as a backhoe, a front shovel, a wheel loader, or another similar machine. Machine 10 may include, among other things, an implement system 13, a powertrain 14, and an operator station 18 for manual control of implement system 13 and powertrain 14. Implement system 13 may be driven by powertrain 14 to repetitively move a work tool 20 between a dig location 22 within a trench and a dump location 24 over haul vehicle 12 during completion of a particular work cycle. It is contemplated, however, that implement system 13 may be configured to move work tool 20 in another manner during a different work cycle, if desired. Powertrain 14, in addition to driving implement system 13, may also function to propel machine 10, for example via one or more traction devices 26.

As shown in FIG. 1, the disclosed implement system 13 may include a linkage structure that cooperates with fluid actuators to move work tool 20. Specifically, implement system 13 may include a boom 28 that is pivotally connected to a frame 30 of machine 10 and vertically movable by a pair of hydraulic cylinders 32 (only one shown in FIG. 1). Implement system 13 may also include a stick 34 that is pivotally connected between boom 28 and work tool 20, and movable by a single hydraulic cylinder 36. Implement system 13 may further include a single hydraulic cylinder 38 operatively connected to vertically pivot work tool 20 relative to stick 34. Frame 30 may be connected to an undercarriage member 40, and swung (together with boom 28, stick 34, and work tool 20) about a vertical axis 42 by a swing motor 44. It is contemplated that a greater or lesser number of fluid actuators may be included within implement system 13 and/or connected in a manner other than described above, if desired. Although fluid actuators are shown in FIG. 1 for manipulating the implement system 13, it will be appreciated that the implement system 13 may include other types of actuators known in the art, such as electric motors, for example.

Powertrain 14 may include, among other things, an engine 15 and a transmission 17. Engine 15 may be secured to frame 30 via a mounting system 16, and may be configured to produce a rotational power output. Transmission 17 may then convert the power output to a desired ratio of speed and torque. The rotational power output may be used to drive a pump that supplies pressurized fluid to cylinders 32, 36, and 38; to swing motor 44; and/or to one or more motors (not shown) associated with traction devices 26. In some embodiments, the rotational power output of engine 15 may additionally be directed to drive a generator that produces electricity used to control machine 10. Engine 15 may be a combustion engine configured to burn a mixture of fuel and air, the amount and/or composition of which directly corresponding to the rotational power output. Transmission 17 of powertrain 14 may take any form known in the art, for example a power shift configuration that provides multiple discrete operating ranges, a continuously variable configuration, or a hybrid configuration.

Operator station 18 may include a cabin for housing one or more operator interface devices 46 located proximate an operator seat (not shown). Interface devices 46 may be embodied as joysticks, pedals, switches, wheels, knobs, and/or any other device known in the art. Interface device 46 may be configured to generate signals that are used to control machine 10. For example, interface device 46 may be a joystick that, when displaced from a neutral position, creates a signal indicative of a desired machine or tool speed or force in a particular direction. This signal may be then be used to actuate any one or more of hydraulic cylinders 32, 36, 38; swing motor 44; and/or the traction motors discussed above.

Numerous different work tools 20 may be attachable to a single machine 10 and controllable via operator station 18. Work tool 20 may include any device used to perform a particular task such as, for example, a bucket, a fork arrangement, a blade, a shovel, a truck bed, or any other task-performing device known in the art. Although connected in the embodiment of FIG. 1 to pivot relative to machine 10, work tool 20 may alternatively or additionally rotate, slide, swing, lift, or move in any other manner known in the art.

Figure 2:
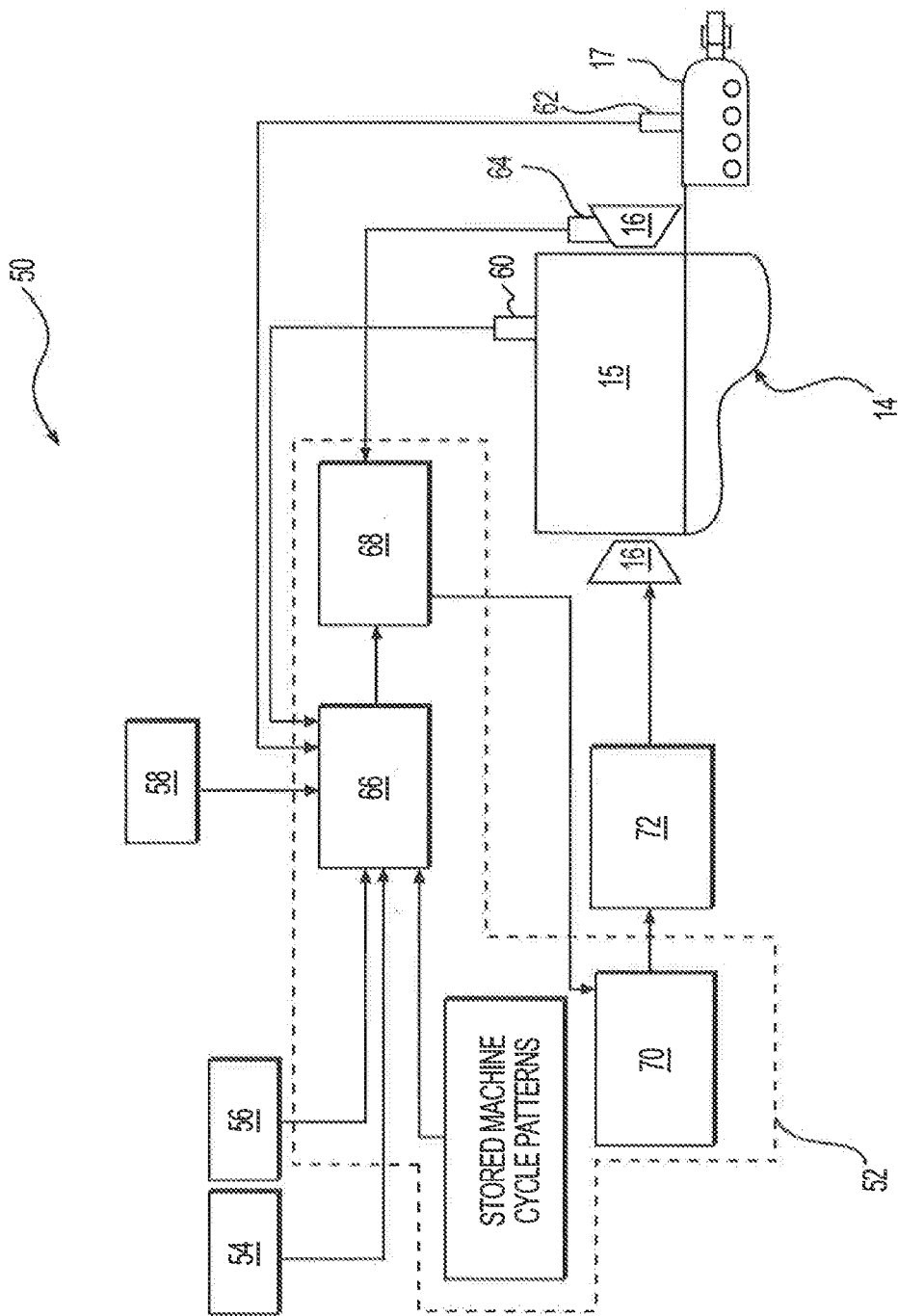
FIG. 2 is a diagrammatic illustration of an exemplary control system that may be used with the machine of FIG. 1 according to an aspect of the disclosure.

As illustrated in FIG. 2, machine 10 may further include a control system 50 configured to monitor and classify operations of machine 10, in order to predict and control vibrations experienced by the operator. In particular, control system 50 may include a plurality of sensors 54, 56, 58, 60, 62, 64, a controller 52 that is in communication with the sensors 54-64, and a vibration inducing device 72 operated by controller 52 in response to signals generated by one or more of sensors 54-64. The sensors communicating with controller 52 may include a load sensor 54, a grade sensor 56, an actuator sensor 58, an engine sensor 60, a transmission sensor 62, a vibration sensor 64, and/or any another sensor known in the art.

Load sensor 54 may be configured to generate a signal indicative of a load carried by, moved by, or otherwise bearing on machine 10. In one example, load sensor 54 is a pressure sensor associated with any one or more of cylinders 32, 36, and 38, the signal from this sensor being used to calculate a load on the corresponding cylinder that can be related to the load carried by work tool 20. In another example, load sensor 54 is a mechanical load cell strategically placed between mating mechanical components of machine 10 (e.g., between linkage members) and/or on support structure of implement system 13, the signal from this sensor being related to strain of the components and used to calculate the load on work tool 20. Other types of load sensors 54 may also be possible. The signals from load sensor 54 may be directed to controller 52 for further processing.

Grade sensor 56 may be configured to determine a grade of a work surface 31 under machine 10. For example, grade sensor 56 may be configured to generate a signal indicative of a position and/or orientation of a particular point on machine 10 (e.g., of an intermediate point on an associated front or rear axle). The position/orientation may then be used to calculate an overall pitch of machine 10 in a travel direction, and a corresponding grade of work surface 31 under machine 10. In an alternative embodiment, grade sensor 56 may be an Inertial Measurement Unit (IMU) having one or more accelerometers and/or gyroscopes that generate signals indicative of the change in machine orientation relative to the force of gravity. It is contemplated that other types of sensors may alternatively be used to determine the grade of work surface 31. Signals generated by grade sensor 56 may be directed to controller 52 for further processing.

Actuator sensor 58 may be associated with the motion of work tool 20 imparted by any one or more of cylinders 32, 36, 38 and/or swing motor 44. For example, sensor 58 may be a rotational position and/or speed sensor associated with the pivoting and/or swinging motion of implement system 13; a local or global coordinate position and/or speed sensor; an extension sensor located internally or externally of cylinders 32, 36, and 38; a fluid pressure sensor; or any other type of sensor known in the art that may generate a signal indicative of a pivot position, acceleration, speed, and/or force of implement system 13. This signal may be sent to controller 52 for further processing. It is contemplated that controller 52 may derive any number of different parameters based on the signals from actuator sensor 58 and an elapsed period of time (e.g., a time period tracked by an internal or external timer—not shown), if desired.

Engine sensor 60 may have one or more components configured to generate a signal indicative of an actual speed. For example, engine sensor 60 may have a component associated with a crankshaft (not shown) of powertrain 14 and/or with a transmission input or output shaft. Engine sensor 60 may include a permanent magnet embedded in any of these rotating shafts, and a stationary sensing element (e.g., a hall-effect element) spaced near the component and configured to detect a rotating field produced by the magnet. Signals generated by the sensing element of engine sensor 60 may be directed to controller 52 for further processing.

Transmission sensor 62 may be configured to detect and/or determine a current gear ratio of powertrain 14. In some embodiments, transmission sensor 64 may be directly associated with powertrain 14 and configured to detect a ratio of input speed-to-output speed. For example, transmission sensor 62 may be a pressure sensor or a rotational speed sensor. In another example, transmission sensor 62 may be associated with operator station 18 (e.g., for example with a shift lever in operator station 18—not shown), and configured to determine a transmission gear ratio selected by the operator. Transmission sensor 62 may alternatively embody a different type of sensor, if desired. Signals generated by transmission sensor 62 may be directed to controller 52 for further processing.

Controller 52 may also be configured to receive direct input indicative of the work cycle of machine 10. These inputs may be received from an operator interface (not shown) prior to planned operation of machine 10. Alternatively, when machine 10 is in an autonomous or a semi-autonomous mode, the input may be received directly from a controller (not shown) operating machine 10. This feature may provide a direct and fast determination of future operation of machine 10. However, to determine accuracy, the inputs may be checked against the predicted operations of controller 52, as further discussed herein.

It should be noted that, while only a single controller 52 is shown in FIG. 2 as communicating with sensors 54-64, any number of separate controllers may collaborate to perform the functions of control system 50. And each of these controllers may include a single module or multiple modules. In the exemplary embodiment of FIG. 2, the disclosed controller 52 has three different modules. These modules include a pattern recognition module 66, an adaptive filter 68, and a processor 70. Numerous commercially available microprocessors can be configured to perform the functions of the different modules of controller 52. It should be appreciated that controller 52 could additionally be embodied in a general machine microprocessor capable of controlling numerous machine functions. Some or all of the modules of controller 52 may include a memory, a secondary storage device, a processor, and any other components for running an application. Various other circuits may be associated with the modules of controller 52, such as power supply circuitry, signal conditioning circuitry, solenoid driver circuitry, and other types of circuitry.

Based on input received from any one or all of sensors 54-62 and/or any direct inputs, pattern recognition module 66 of controller 52 may be configured to classify a current operation of machine 10 as one of a plurality of known segments of the work cycle, in order to predict powertrain induced vibrations. In some embodiments, the inputs may include one or more of: the material payload currently inside work tool 20, the grade of work surface 31 currently under machine 10, the current travel direction of machine 10, the current gear ratio of transmission 17, the actual engine speed of engine 15, and an operator input indicating the work cycle information. As will be described in more detail below, a probability may be calculated, at least in part based on how well recorded operations match corresponding aspects of stored operations. If the probability is less than a threshold, controller 52 may continue to monitor sensors 54-62. If the probability exceeds the threshold, then controller 52 may classify the operation as one of the plurality of predetermined segments of the work cycle, while continuing to monitor sensors 54-62.

For example, the current operation may be classified as one of a dig segment, a move-to-truck segment, a dump segment, and a move-to-trench segment. It is contemplated, however, that controller 52 may alternatively classify the current operation of machine 10 as another segment known in the art (e.g., a segment associated with a haul truck cycle or a dozing cycle), if desired. One or more maps relating signals from sensors 54-62 to the different segments of the work cycle may be stored within the memory of controller 52. Each of these maps may include a collection of data in the form of tables, graphs, and/or equations. In one example, threshold forces associated with the start and/or end of one or more of the operations may be stored within the maps. In another example, positions of machine 10 and/or linkages of implement system 13 may be associated with the operations and stored in the maps.

For example, controller 52 may classify the current excavation operation as the dig operation or the move-to-truck operation when a current swing speed of machine 10 falls below or exceeds a percent of a maximum swing speed, when the pivot speed falls below or exceeds a threshold speed value, when the pivot force is less or greater than a threshold value, and/or when the pattern of input from the operator matches or nearly matches other stored input patterns. The other operations of machine 10 may be classified in a similar manner. As will be described in more detail below, controller 52 (e.g., pattern recognition module 66) may be configured to compare recorded operations of machine 10 to the pattern of operations stored in memory, and to match the current operation of machine 10 with a particular segment of the work cycle.

Based on the determination of the operation of machine 10, controller 52 may determine powertrain induced vibrations corresponding to the particular segment of the work cycle according to the maps stored in the memory of controller 52. Controller 52 may also determine whether there is any expected non-powertrain induced vibrations. Controller 52 may then tune a listening window, by adjusting a responsive frequency of adaptive filter 68 to capture primarily powertrain induced vibrations, while filtering out non-powertrain induced vibrations. The adjustment can save the band resource of adaptive filter 68, and hence improve efficiency. Furthermore, filtering out the non-powertrain induced vibrations may improve stability of control system 50 by reducing responsiveness to vibrations that control system 50 cannot attenuate.

Controller 52 may also receive signals from vibration sensor 64. Vibration sensor 64 may include one more structures positioned anywhere on machine 10 to detect vibrations induced by powertrain 14 and/or vibration inducing device 72. For example, vibration sensor 64 may embody accelerometers, pressure sensors, strain gauges, or any other sensor if desired. One or more vibration sensors 64 may be positioned in and/or on mounting system 16, as depicted in FIG. 2. Vibration sensors 64 may, additionally or alternatively, be positioned in and/or on one or more of powertrain 14 (e.g.

engine 15 and/or transmission 17), frame 30, and/or cabin of operator station 18. In one embodiment, an array of vibration sensors 64 may be positioned at different locations in the cabin. Vibration sensors 64 may include a band-width filter to isolate the vibrations that may cause discomfort to the operator.

Signals generated by vibration sensor 64 may be directed to adaptive filter 68 for further processing to distinguish powertrain induced vibrations from non-powertrain induced vibrations. For example, adaptive filter 68 may filter out vibrations according to a threshold of duration, amplitude, and/or frequency. For example, adaptive filter 68 may discard vibrations that are too fleeting (e.g. vibrations induced by a single ground impact), which may be indicative that the vibration was not induced by powertrain 14. Adaptive filter 68 may be configured to discard wavelengths that have either an amplitude and/or frequency that are too high/low to be perceived by the operator. Adaptive filter 68 may further process the signal by filtering out wavelengths that do not fall within the listening window. The vibrations determined to be powertrain induced may be compiled to form a vibration profile normally experienced during each segment of the work cycle. The vibration profile may be updated at any rate, and may be saved and stored in the maps for use by controller 52. The vibration profile may also be sent to processor 70.

Processor 70 may be configured to receive the vibration profiles of powertrain 14 and then generate a command wave designed to dampen the powertrain induced vibrations. The command wave may approximate the vibration profile generated by adaptive filter 68, but may be shifted by about 180 degrees in phase. The command wave may be formed by superimposing any number of wavelengths having a variety of frequencies and/or amplitudes. After forming the command wave, processor 70 may then be configured to compare the command wave with a capacity of vibration inducing device 72. If incompatible with vibration inducing device 72, processor 70 may be configured to modify the command wave by truncating components (e.g., amplitudes and/or frequencies) of the command wave that exceed the capacity of vibration inducing device 72.

Processor 70 may be configured to then send the modified command wave to vibration inducing device 72 to dampen the powertrain induced vibrations. Vibration inducing device 72 may include any mechanism configured to generate and direct canceling vibrations to powertrain 14. Vibration inducing device 72 may be rigidly connected to mounting system 16, powertrain 14, and/or frame 30, and include one or more motors that rotate an eccentric weight. In one embodiment, the motor of vibration inducing device 72 is hydraulically powered. In this configuration, a pressure and/or a speed of fluid flow through the motor, in connection with a size and eccentricity of the attached weight, may be controlled to affect an amplitude, frequency, and/or phase of the resulting canceling vibration that counteract the powertrain induced vibrations. In another embodiment, vibration inducing device 72 may include an electrically powered motor.

Figure 3:
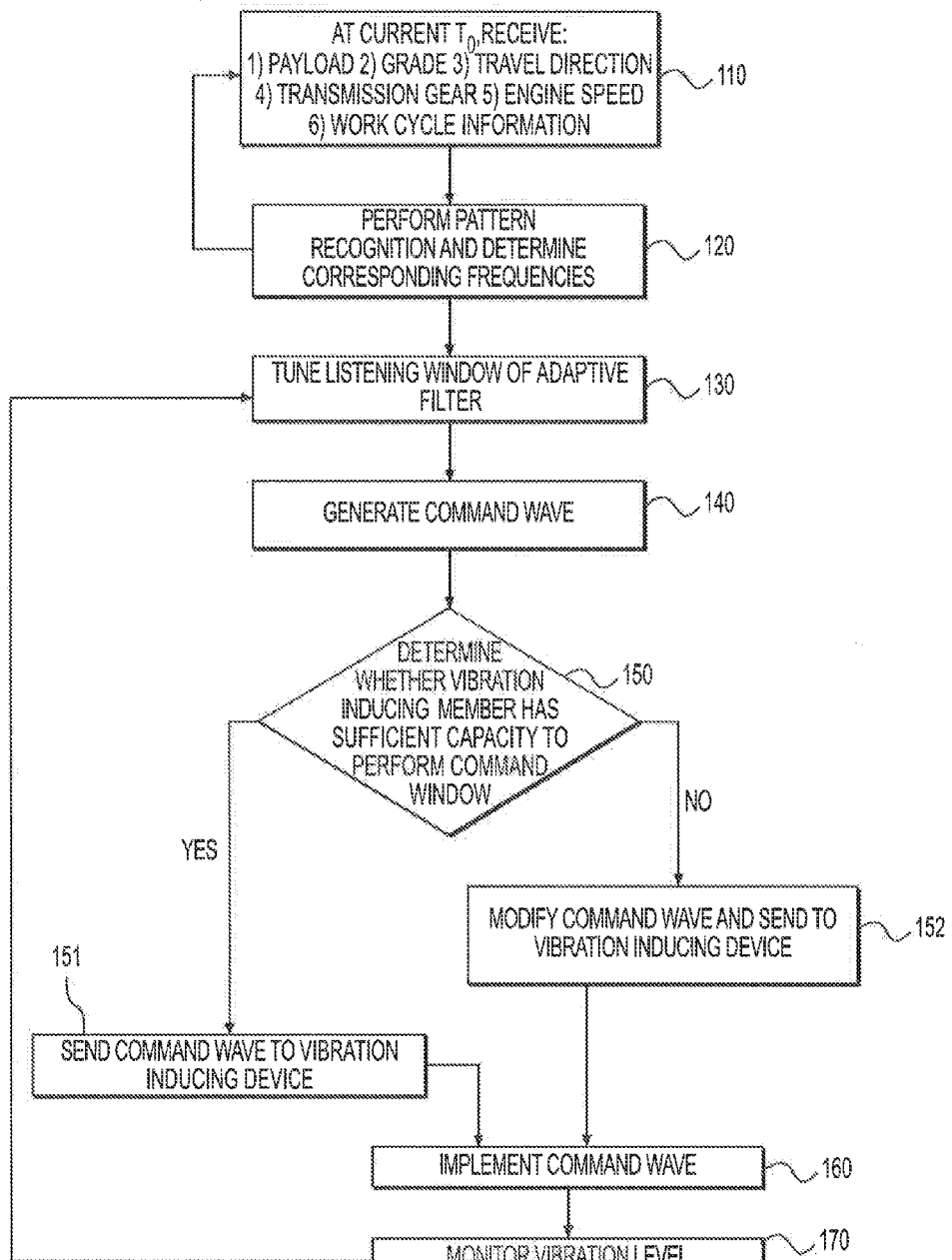
FIG. 3 is a flowchart illustrating an exemplary process that may be performed by the control system of FIG. 2 according to an aspect of the disclosure.

FIG. 3 illustrates the machine control method performed by controller 52. FIG. 3 will be discussed in more detail below to further explain the disclosed concepts.

INDUSTRIAL APPLICABILITY

The disclosed control system may be used on any machine where an operator is exposed to vibrations. By proactively predicting and responding to certain vibration windows, control system 50 may prolong the period of time an operator may remain on machine 10. In addition, the system may obviate the need for the owner of machine 10 to periodically vary the vibration and time thresholds on machine 10 to conform to any changes in regulations. Operation of control system 50 will now be described with respect to FIG. 3.

In Step 110, sensors 54-62 of control system 50 may generate and transmit signals to controller 52 (e.g. pattern recognition module 66) indicative of operation of machine 10. In particular, control system 50 may sense operational parameters at a current time $T_0$ that are indicative of 1) material payload currently inside work tool 20, 2) the grade of work surface 31 currently under machine 10, 3) the current travel direction of machine 10, 4) the current gear ratio of transmission 17, 5) the actual engine speed of engine 15, and 6) an operator input indicating the work cycle information. It is also contemplated that controller 52 may receive additional or different operation parameters. For example, control system 50 may determine that 1) the tool is loaded, 2) work surface 31 is level, 3) machine 10 is stationary, 4) transmission 17 is in park, 5) engine 15 is functioning at 1800 rpm, and 6) the current segment of the work cycle is unknown.

In Step 120, controller 52 (e.g. pattern recognition module 66) may then determine whether the operation parameters at current time $T_0$ matches a known pattern. For example, an excavating work cycle may include a dig segment, a lift segment, a swing-to-truck segment, a dump segment, and a swing-to-truck segment. During the dig segment, machine 10 may typically have a load on implement system ranging from 1,000-1,500 psi and engine 15 may typically be operating at about 1600 rpm when in park on a level surface. Controller 52 may compare the operational parameters received from sensors 54-62 to previously stored data associated with known work cycles. If controller 52 determines that the data input by sensors 54-62 at current time $T_0$ matches a particular operation (e.g., a dig segment), controller 52 may anticipate the next operations to be performed by machine (e.g., the lift segment, followed by the swing-to-truck segment, the dump segment, then the swing-to-truck segment).

In some instances, however, data from sensors 54-62 may not generate an exact match to any known segment. When this happens, a pattern may be determined by generating a degree of probability that the current operation of machine 10 matches a previously stored operation associated with a known work cycle. In particular, based on any number of the operational parameters (e.g., payload, grade, travel direction, transmission gear, engine speed, and work cycle information) recorded at any number of instants in time before time $T_0$ (e.g., $T_{-k}$ to $T_0$), controller 52 may conclude with a certain probability that the current operation at time $T_0$ is associated with a known segment of the work cycle. In the determination, controller 52 may also include weighting factors for the instants of time before time $T_0$ (e.g., e.g., $T_{-k}$ to $T_0$), and may be more heavily biased for closer instants of time. The probability that the current operation at time $T_0$ is a particular segment of the known work cycle may be calculated on how well the performance parameters recorded for times $T_{-4}$ to $T_0$ match the pre-recorded parameters.

Controller 52 may then determine if the probability exceeds a threshold probability. In one example the threshold probability may be about 50%, although other values may also be utilized. If the probability of correct classification is less than the threshold probability, no proactive tuning may be performed. However, if an exact match is found or a probability is more than the threshold probability, controller 52 may determine that the powertrain 14 may produce known frequencies of vibrations during these predicted segments, according to previously stored data from these work cycle segments. The listening window of adaptive filter 68 may then be tuned to listen to only these frequencies (e.g. all other frequencies associated with non-powertrain induced vibrations may be ignored), in Step 130.

The listening window may include a plurality of discrete ranges of responsive frequencies that may be defined by tolerances (e.g., +/− about 2 Hz). The responsive frequencies may correspond to a constant value, K, having a maximum value, m, and current and anticipated engine speeds. The responsive frequency may be determined by equation (1), as disclosed below. The maximum value, m, of the constant value may be determined by a number of factors. The maximum value may correspond to the transmissibility of mounting system 16 and/or the current and/or anticipated segment of the work cycle. For example, the maximum value, m, may be 6 for an anticipated dump segment when the engine speed is 1800 rpm, and may vary depending on the anticipated change in engine speed and/or segments of the work cycle. The maximum value, m, may be updated and recalled from the maps stored in the memory of controller 52.

$$\text{Responsive Frequencies} = K/2 \times \text{Engine Speed(rpm)}/60 \quad (K=1,2,3,4,5\ldots m) \quad (1)$$

The current and anticipated engine speeds, and corresponding frequencies, may be determined by the work cycle of machine 10. For example, when it is determined that machine 10 is currently performing the swing to truck segment, controller 52 may expect that the dump segment will follow. From empirical machine cycle data, powertrain speed typically increases to 1800 rpm during the dumping segment from 1700 rpm due to the decrease of payload. Anticipating the dumping segment, controller 52 may then add 15+/−2 Hz, 30+/−2 Hz, 45+/−2 Hz, 60+/−2 Hz, 75+/−2 Hz, and 90+/−2 Hz to the listening window of adaptive filter 68 for the expected 90 second duration of the dump segment. In one embodiment, the added frequencies may supplement stored frequencies (e.g., corresponding to the previous segments) of the listening window. In another embodiment, the added frequencies may replace any frequencies of the listening window corresponding to previous segments of the work cycle.

All other frequencies that do not correspond to the responsive frequencies may be ignored during the anticipated segment of the work cycle. Accordingly, controller 52 may not respond to vibration signals that were not generated by powertrain 14. This may improve stability of control system 50 by reducing responsiveness to fleeting vibrations that control system 50 cannot attenuate. Adaptive filter 68 may continually, or based on discrete time segments, tune the listening window (e.g., adjust the responsive frequencies) based on operating parameters that are sensed by control system 50.

After the listening window has been established at current time $T_0$, adaptive filter 68 may receive signals from vibration sensor 64, indicative of actual vibrations of machine 10. Adaptive filter 68 may process the signals from vibration sensor 64 and generate a vibration profile compiled from the sensed vibrations determined to be induced by powertrain 14. Adaptive filter 68 may also compile actual vibration profiles based on anticipated machine 10 operations, as discussed above.

In step 140, processor 70 may receive the anticipated powertrain profiles and generate a command wave designed to dampen the anticipated powertrain induced vibrations. The command wave may approximate the vibration profile generated by adaptive filter 68, but shifted by about 180 degrees in phase. However, if the generated vibration does not actually cancel the existing vibration, the total vibration can instead increase thus resulting in unstable conditions. Thus, the signal from vibration sensor 64 may function as an error signal, determining powertrain induced vibrations that were not cancelled. Processor 70 may accordingly function as a feedback control module for the vibrations of the system to minimize the error signal from vibration sensor 64. In order to ensure stability, processor may adjust poles of the command wave according to one of the root locus algorithm, the loop shaping adjustment algorithm, and other algorithms known in the art. For illustrative purposes, the root locus method is given below as one of the adjustment methods. The feedback control may be described by convoluting functions in time domain. In order to simplify the expression of transfer function, Laplace transform might be performed according to equation (2), as shown below, where f(t) is a generic function.

$$\mathcal{L}\{f(t)\} = \int_0^\infty \exp(-st)f(t)dt \quad (2)$$

The transfer function for equation (2) is illustrated in equation (3), as shown below, where H(s) is the general transfer function in Laplace domain, and 1+G(s) is the general characteristic function of controller 52.

$$H(s) = \frac{G(s)}{1 + G(s)} \quad (3)$$

The poles of equation (3) may be determined by the roots of the denominator (e.g., the roots of the characteristic function). In one embodiment, the transfer function H(s) can be given by the general form provided by equation (4).

$$H(s) = \frac{As^2 + Bs + C - 1}{As^2 + Bs + C} \quad (4)$$

A, B and C are coefficients associated with the gains of the controller 52. Thus, poles can be expressed by equation (5).

$$\text{Pole} = \frac{-B + / - \sqrt{B^2 - 4AC}}{2A} \quad (5)$$

The location of poles can be determined by adjusting the gains of controller 52 to change the relationship between the B value and the product of A and C. For example, when B<4AC, the poles are real and unequal. However, when B=4AC, the poles are real and equal, and when B>4AC, the poles are complex conjugates. Controller 52 may adjust the poles of the closed loop system, according to anticipated segments of the work cycle, such that the poles are complex conjugates in order to improve the stability margin.

After the command wave is generated in Step 140, controller 52 may proceed to Step 150. In Step 150, controller 52 (e.g. processor 70) may determine whether vibration inducing device 72 is capable of implementing the command wave. If YES [Step 151], controller 52 sends the command wave to vibration inducing device 72, where vibration inducing device 72 implements the command wave in Step 160. If NO [Step 152], controller 52 may modify the command wave (e.g. truncate signal frequency or amplitudes) to provide a modified command wave compatible with vibration inducing device 72. Controller 52 may then send the modified command wave to vibration inducing device 72, where vibration inducing device 72 implements the modified command wave in Step 160.

In Step 170, vibration sensor 64 may monitor the vibration levels of one or more of powertrain 14, frame 30, and/or cabin of operator station 18 to determine the effects of vibration inducing device 72. Vibration sensor 64 may then generate an indicative signal and transmit the signal back to controller 52 to provide feedback. Based on the feedback, controller 52 may adjust the profiles stored in the memory and/or the algorithms used to generate future command waves.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A vibration control system for a machine having a powertrain secured to the machine by a mounting system, comprising:
    a first sensor configured to generate a first signal indicative of a parameter of a work cycle of the machine;
    a second sensor configured to generate a second signal indicative of vibrations induced by the powertrain;
    a vibration inducing device; and
    a controller in communication with the first sensor, the second sensor, and the vibration inducing device, the controller being configured to:
        classify a current operation of the machine as one of a plurality of predetermined segments of the work cycle based on the first signal;
        predict a vibration profile that will be generated by the machine during a future segment of the work cycle;
        tune a listening window based on the vibration profile; and
        generate a command wave directed to the vibration inducing device to generate canceling vibrations during the future segment based on the second signal received within the listening window.

2. The control system of claim 1, wherein the vibration inducing device is configured to contact the mounting system and to offset vibrations induced by the powertrain.

3. The control system of claim 1, wherein the current operation is classified by determining a degree of probability based on parameters of a plurality of time points, and the degree of probability is compared to a threshold.

4. The control system of claim 1, wherein the controller includes memory having stored vibration profiles, and the controller is configured to update the stored vibration profiles based on the first and second signals.

5. The control system of claim 1, wherein the controller is further configured to adjust poles of the command wave to optimize a stability margin.

6. The control system of claim 1, wherein the parameter includes at least one of a payload, a grade, a travel direction, a transmission gear, and an engine speed.

7. The control system of claim 1, wherein the second sensor is configured to be positioned on at least one of the mounting system, the powertrain, a frame, and an operator station.

8. The control system of claim 1, wherein the controller is configured to modify the command wave depending on a capacity of the vibration inducing device.

9. The control system of claim 1, wherein the controller is configured to ignore vibrations having frequencies outside of the listening window.

10. The control system of claim 1, wherein the second sensor is configured to provide feedback to the controller.

11. A method of controlling vibrations of a machine having a powertrain, the method comprising:
    sensing a parameter indicative of a work cycle of the machine and responsively generating a first signal;
    classifying, by a controller, a current operation of the machine as one of a plurality of predetermined segments of the work cycle based on the first signal;
    predicting, by a controller, a vibration profile that will be generated by the machine during a future segment of the work cycle;
    tuning, by a controller, a listening window based on the vibration profile;
    sensing vibrations induced by the powertrain and received within the listening window; and
    generating, by a controller, a command wave based on the sensed vibrations to generate canceling vibrations during the future segment.

12. The method of claim 11, wherein the canceling vibrations offset vibrations induced by the powertrain.

13. The method of claim 11, further including tuning the listening window based on predicted non-powertrain induced vibrations.

14. The method of claim 11, further including filtering out vibrations according to a threshold of duration.

15. The method of claim 11, further including filtering out vibrations according to a threshold of amplitude.

16. The method of claim 11, further including adjusting poles of the canceling vibrations to optimize a stability margin.

17. The method of claim 11, further including modifying the command wave based on the capacity of the vibration inducing device.

18. The method of claim 11, further including ignoring vibrations having frequencies outside of the listening window.

19. The method of claim 11, further including accessing memory having stored vibration profiles, and updating the stored vibration profiles based on the first and second signals.

20. A machine comprising:
    a frame;
    an implement system connected to the frame and configured to perform a work cycle;
    a powertrain supported by the frame and including an engine and a transmission; and
    a vibration control system including:
        a first sensor configured to generate a first signal indicative of a parameter of the work cycle;
        a second sensor configured to generate a second signal indicative of vibrations induced by the powertrain;
        a vibration inducing device; and
        a controller in communication with the first sensor, the second sensor, and the vibration inducing device, the controller being configured to:
            classify a current operation of the machine as one of a plurality of predetermined segments of the work cycle based on the first signal;
            predict a vibration profile that will be generated by the machine during a future segment of the work cycle;
            tune a listening window based on the vibration profile; and
            generate a command wave directed to the vibration inducing device to generate canceling vibrations during the future segment based on the second signal received in the listening window.

\* \* \* \* \*